(12) United States Patent
Bligård et al.

(10) Patent No.: US 8,543,288 B2
(45) Date of Patent: Sep. 24, 2013

(54) DIAGNOSTIC METHOD AND APPARATUS FOR AN EXHAUST PRESSURE REGULATOR

(75) Inventors: Per-Åke Bligård, Göteborg (SE); Vinka Miketa, Göteborg (SE); Göran Olsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 107 days.

(21) Appl. No.: 13/139,302

(22) PCT Filed: Dec. 12, 2008

(86) PCT No.: PCT/SE2008/000696
§ 371 (c)(1),
(2), (4) Date: Sep. 6, 2011

(87) PCT Pub. No.: WO2010/068146
PCT Pub. Date: Jun. 17, 2010

(65) Prior Publication Data
US 2011/0313615 A1    Dec. 22, 2011

(51) Int. Cl.
*G01M 17/00*    (2006.01)
(52) U.S. Cl.
USPC ............................................ 701/34.4
(58) Field of Classification Search
USPC ............................................... 701/34
See application file for complete search history.

(56) References Cited

U.S. PATENT DOCUMENTS

| | | | |
|---|---|---|---|
| 5,079,921 A * | 1/1992 | McCandless et al. | 60/602 |
| 6,085,525 A * | 7/2000 | Håkansson | 60/602 |
| 6,497,097 B2 * | 12/2002 | Schmidt et al. | 60/602 |
| 6,687,601 B2 * | 2/2004 | Bale et al. | 701/108 |
| 7,051,689 B2 * | 5/2006 | Tamura et al. | 123/90.15 |
| 7,240,491 B2 * | 7/2007 | Olsson et al. | 60/624 |
| 7,263,427 B2 * | 8/2007 | Hasegawa et al. | 701/107 |
| 8,195,354 B2 * | 6/2012 | Kariya et al. | 701/29.1 |
| 8,316,828 B2 * | 11/2012 | Whitney et al. | 123/568.16 |
| 8,352,165 B2 * | 1/2013 | Olsson | 701/112 |

(Continued)

FOREIGN PATENT DOCUMENTS

| | | |
|---|---|---|
| EP | 1323912 B1 * | 9/2007 |
| JP | 8210123 A1 * | 8/1996 |

(Continued)

OTHER PUBLICATIONS

International Search Report for corresponding International Application PCT/SE2008/000696.

*Primary Examiner* — Mary Cheung
*Assistant Examiner* — Michael Berns
(74) *Attorney, Agent, or Firm* — WRB-IP LLP

(57) ABSTRACT

A diagnostic method for an exhaust pressure regulator provided in an exhaust system connected to a turbocharged internal combustion engine includes demanding engine brake, measuring a back pressure in the exhaust system by a back pressure sensor provided between the exhaust pressure regulator and a turbo unit when demanding engine brake, measuring the boost pressure by a boost pressure sensor provided in the inlet manifold when demanding engine brake, comparing the measured back pressure and the measured boost pressure with stored back pressure and boost pressure values in order to determine whether there is a defective pressure regulator or a defective backpressure sensor. A diagnostic apparatus for an exhaust pressure regulator provided in an exhaust system connected to a turbocharged internal combustion engine is also provided.

14 Claims, 1 Drawing Sheet

(56) References Cited

U.S. PATENT DOCUMENTS

| | | |
|---|---|---|
| 2004/0244473 A1 | 12/2004 | Tamura et al. |
| 2006/0184310 A1* | 8/2006 | Hasegawa .................. 701/114 |
| 2008/0209887 A1 | 9/2008 | Hanari et al. |

FOREIGN PATENT DOCUMENTS

| | | |
|---|---|---|
| SE | 529406 C2 | 7/2007 |
| WO | 2007129970 A1 | 11/2007 |
| WO | 2008008005 A1 | 1/2008 |

* cited by examiner

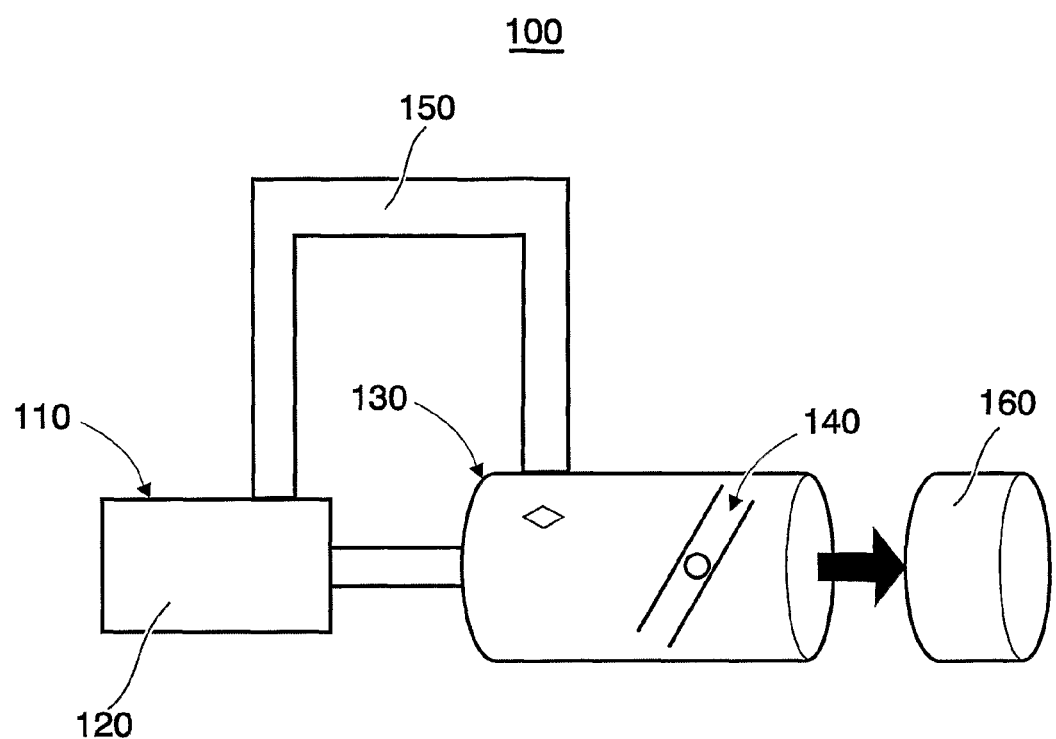

DIAGNOSTIC METHOD AND APPARATUS FOR AN EXHAUST PRESSURE REGULATOR

BACKGROUND AND SUMMARY

The invention relates to a control method for diagnosing an exhaust pressure regulator.

Present regulatory conditions in the automotive market have led to an increasing demand to improve fuel economy and reduce emissions in present vehicles. These regulatory conditions must be balanced with the demands of a consumer for high performance and quick response for a vehicle.

An exhaust gas pressure regulator is used in many types of engines to create a back pressure in the exhaust gas system, for example in order to improve the braking force of a four-stroke or two stroke internal combustion engine. In addition, the back pressure from an exhaust gas pressure regulator can be utilized to increase the amount of re-circulated gas to the intake side, so called EGR-gas. In addition, the back pressure can be utilized for heating up the engine more quickly when starting. An exhaust gas pressure regulator is normally located downstream of a turbo charging system in order not to have an adverse effect on the efficiency.

An exhaust gas pressure regulator, for instance a butterfly flap, may work together with a pressure sensor situated between a turbine of a turbo and said butterfly flap. The problem today is that it is not possible to determine whether it is the flap or the pressure sensor that is the source of an eventual failure. E.g., if the pressure sensor displays a faulty low pressure, then the system wants to close the butterfly flap even more, which may result in severe engine damages.

It is desirable to provide an improved diagnosis method of an exhaust gas pressure regulator.

In a first aspect of the present invention it is provided a diagnostic method for an exhaust pressure regulator provided in an exhaust system connected to a turbocharged internal combustion engine, comprising the steps of: demanding engine brake, measuring a back pressure in the exhaust system by a back pressure sensor when demanding engine brake, measuring the boost pressure by a boost pressure sensor when demanding engine brake, comparing the measured back pressure and the measured boost pressure with stored back pressure and boost pressure values in order to determine whether there is a defective pressure regulator or a defective backpressure sensor.

An advantage of this embodiment of the present invention is that it will yield in safer and more precise diagnostics.

Another advantage of the present invention is that it will be easier to trace faults in the system.

Still another advantage of the present invention is that it also will minimize the risk of engine damage due to failure on the system.

In another embodiment of the present invention it further comprising the step of alarming an operator if there is a defective pressure regulator or back pressure sensor.

An advantage of this embodiment is that the fault not only can be traced during servicing the vehicle but also actively alarming the driver of the vehicle that something is wrong. The driver may take own decisions on what to do, for instance shutting off the engine. The decision of shutting off the engine may also be automatically performed depending on the severity of the problem.

In still another embodiment of the present invention said backpressure sensor is defective if the measured backpressure is below a predetermined value and the measured boost pressure is below a predetermined value.

In still another example embodiment of the present invention said pressure regulator is defective if the measured backpressure is below a predetermined value and the measured boost pressure is above a predetermined value.

In yet another embodiment of the present invention said backpressure sensor is defective if the measured backpressure is above a predetermined value and the measured boost pressure is above a predetermined value.

In yet another example embodiment of the present invention said pressure regulator is defective if the measured backpressure is above a predetermined value and the measured boost pressure is below a predetermined value.

The advantages of the above mentioned example embodiments are that different failure reasons may be separated by comparing detected back pressure and boost pressure.

In another aspect of the present invention it is provided a diagnostic apparatus for an exhaust pressure regulator provided in an exhaust system connected to a turbocharged internal combustion engine, comprising: means for demanding engine brake, means for measuring a back pressure in the exhaust system by a back pressure sensor when demanding engine brake, means for measuring the boost pressure by a boost pressure sensor when demanding engine brake, means for comparing the measured back pressure and the measured boost pressure with stored back pressure and boost pressure values in order to determine whether there is a defective pressure regulator or a defective backpressure sensor.

BRIEF DESCRIPTION OF THE DRAWINGS

The present invention together with the above-mentioned and other objects and advantages may best be understood from the following detailed description of the embodiments, but not restricted to the embodiments, wherein is shown schematically:

FIG. 1 a first embodiment of an exhaust gas pressure regulator system according to the invention;

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 illustrates an example embodiment of a gas pressure regulator system 100 according to the present invention. Said system 100 comprising an internal combustion engine 120, a boost pressure sensor 110, a back pressure sensor 130, a pressure regulator 140, an Exhaust Gas Recirculation (EGR) circuit 150, a Selective Catalytic Reaction (SCR) 160. The boost pressure sensor 110 measures boost pressure from a turbocharger in the inlet manifold. The turbo charger may be a single turbo unit, a two stage turbo unit (serial or parallel), a Variable Geometry Turbine (VGT) or a turbo compound unit or combinations of these units. The internal combustion engine may be a diesel engine working alone or in combination with other power sources such as electrical motors, i.e., hybrid technology.

The back pressure sensor 130 measures the back pressure in the exhaust system between the pressure regulator 140 and the turbo unit. An alternative location of the sensor may be upstream the turbine, e.g., in the exhaust manifold. The pressure regulator 140 may be a butterfly flap as indicate din FIG. 1 or other means for adjusting the flow passage of exhaust gases from the engine. Such means may be a sliding wall, a moving piston etc. The means for adjusting the flow passage may be made by an electrical motor or fluid pressure such as oil or compressed air.

Downstream the back pressure regulator there may be arranged an exhaust gas after treatment systems such as Diesel oxidation catalyst (DOC), diesel particulate filter (DPF), SCR and a Clean Up Catalyst.

An EGR circuit 150 with an EGR valve (not illustrated) may be provided between the exhaust pressure regulator 140 and the inlet manifold according to well known manner.

If the back pressure sensor 130 measures a too low pressure, i.e., below a predetermined value that depends on after treatment configuration and engine conditions such as engine load that can be in range of 0 to 50 kPa or a pressure that equals zero, then the failure type is that the pressure regulator 140 is open (regardless the actual mechanical position).

A first possible cause may be that the pressure regulator is stuck in an open or a semi-open position when engine brake is demanded. Open position will mean low back pressure sensed by the back pressure sensor 130. There are no physical flap position measurement available.

A second possible cause may be that the back pressure sensor 130 is clogged or has an electrical fault that will be detected by the system as Open Circuit (OC) or Short Circuit High (SCH).

A clogged pressure sensor will mean a measured back pressure that is too low, that can be in range of 0 to 50 kPa, which in turn will result in higher pressure to the air cylinder until the max pressure is reached. This yields in reality in very high back pressures that may result in engine damages. The driver will initially be happy since the brake power will be increased and will probably not notice a fault, until the engine breaks down. To avoid this, a "safe limp home" mode may be used, i.e. the flap will be controlled open loop, disregarding the sensor value, and a low back pressure will be used.

The boost pressure can be used to separate between these two faults. If the boost pressure is high, then the butterfly flap really is open. If the boost pressure is low, then the butterfly flap really is closed and the sensor is clogged. This high and low boost pressures are very much system dependent.

Said boost pressure is said to be high, if it is above a normal operating range in monitored working area, i.e., monitored working area is the area which has specific characteristics which is suitable for monitoring boost pressure such as high demanded and/or factual torque from the engine.

Said the boost pressure is said to be low, if it is below a normal operating range in monitored working area, i.e., monitored working area is the area which has specific characteristics which is suitable for monitoring boost pressure such as high demanded and/or factual torque from the engine.

The back pressure sensor may be provided between said exhaust pressure regulator and a turbo unit. The back pressure sensor may also be provided in an exhaust gas manifold upstream a turbo unit.

The boost pressure sensor may be provided in the inlet manifold. The boost pressure sensor may also be provided between a compressor of a turbo unit and an inlet valve of the internal combustion engine.

The other failure type is that the measured back pressure is too high, indicating that the pressure regulator is stuck in closed position.

A first possible cause may be that the back pressure sensor faulty measures too high pressure compared to a demanded pressure from engine brake function, indicating that the pressure regulator is closed, yielding in too low brake power.

The second possible cause may be that the flap is mechanically stuck in closed or semi-closed position. This failure is the most important one to detect since it will cause great risk on engine damage and also on the aftertreatment system.

The boost pressure can be used to separate between these two faults.

If the boost pressure during engine running is ok, i.e., in defined supervised area measures expected boost pressure, then the pressure regulator is open and that the back pressure sensor shows an incorrect value. This will cause reduced braking power that maybe is not as serious as the following failure.

If the boost pressure during engine running is low, i.e., in defined supervised area measures lower boost pressure than expected then the pressure regulator really is in closed or semi-closed position.

If the pressure regulator is in semi-closed position then this should be fixed and the driver should be noticed (high temperatures, increased fuel consumption etc). Safe-mode should be used, and will lead to reduced demanded back pressure, about 30-50%, to avoid too high exhaust back pressure that can damage the engine.

The invention claimed is:

1. A diagnostic method for an exhaust pressure regulator provided in an exhaust system connected to a turbocharged internal combustion engine, comprising:
   (a) demanding engine brake,
   (b) measuring a backpressure in the exhaust system by a backpressure sensor when demanding engine brake,
   (c) measuring boost pressure by a boost pressure sensor when demanding engine brake, and
   (d) comparing the measured backpressure and the measured boost pressure with stored backpressure and boost pressure values in order to determine whether there is a defective pressure regulator or a defective backpressure sensor.

2. The diagnostic method according to claim 1, comprising:
   providing the backpressure sensor between the exhaust pressure regulator and a turbo unit.

3. The diagnostic method according to claim 1, comprising:
   providing the backpressure sensor in an exhaust gas manifold upstream a turbo unit.

4. The diagnostic method according to claim 1, comprising:
   providing the boost pressure sensor in an inlet manifold.

5. The diagnostic method according to claim 1, comprising:
   providing the boost pressure sensor between a compressor of a turbo unit and an inlet valve of the internal combustion engine.

6. The diagnostic method according to claim 1, comprising (e) Alarming an operator if there is a defective pressure regulator or backpressure sensor.

7. The diagnostic method according to claim 1, wherein the backpressure sensor is defective if the measured backpressure is below a predetermined value and the measured boost pressure is below a predetermined value.

8. The diagnostic method according to claim 1, wherein the pressure regulator is defective if the measured backpressure is below a predetermined value and the measured boost pressure is above a predetermined value.

9. The diagnostic method according to claim 1, wherein the backpressure sensor is defective if the measured backpressure is above a predetermined value and the measured boost pressure is above a predetermined value.

10. The diagnostic method according to claim 1, wherein the pressure regulator is defective if the measured backpressure is above a predetermined value and the measured boost pressure is below a predetermined value.

11. A diagnostic apparatus for an exhaust pressure regulator provided in an exhaust system connected to a turbocharged internal combustion engine, comprising:
- (a) means for demanding engine brake,
- (b) means for measuring a backpressure in the exhaust system by a backpressure sensor provided between the exhaust pressure regulator and a turbo unit when demanding engine brake,
- (c) means for measuring boost pressure by a boost pressure sensor provided in the inlet manifold when demanding engine brake, and
- (d) means for comparing the measured backpressure and the measured boost pressure with stored backpressure and boost pressure values in order to determine whether there is a defective pressure regulator or a defective backpressure sensor.

12. The diagnostic apparatus according to claim 11, further comprising means for alarming an operator if there is a defective pressure regulator or backpressure sensor.

13. A vehicle comprising means for performing diagnostic method for an exhaust pressure regulator provided in an exhaust system connected to a turbocharged internal combustion engine, the method comprising:
- (a) demanding engine brake,
- (b) measuring a backpressure in the exhaust system by a backpressure sensor when demanding engine brake,
- (c) measuring boost pressure by a boost pressure sensor when demanding engine brake, and
- (d) comparing the measured backpressure and the measured boost pressure with stored backpressure and boost pressure values in order to determine whether there is a defective pressure regulator or a defective backpressure sensor.

14. A vehicle comprising:
a diagnostic apparatus for an exhaust pressure regulator provided in an exhaust system connected to a turbocharged internal combustion engine, the diagnostic apparatus comprising;
- (a) means for demanding engine brake,
- (b) means for measuring a backpressure in the exhaust system by a backpressure sensor provided between the exhaust pressure regulator and a turbo unit when demanding engine brake,
- (c) means for measuring the boost pressure by a boost pressure sensor provided in the inlet manifold when demanding engine brake, and
- (d) means for comparing the measured backpressure and the measured boost pressure with stored backpressure and boost pressure values in order to determine whether there is a defective pressure regulator or a defective backpressure sensor.

* * * * *